US011423597B2

(12) United States Patent
Bala et al.

(10) Patent No.: US 11,423,597 B2
(45) Date of Patent: Aug. 23, 2022

(54) METHOD AND SYSTEM FOR REMOVING SCENE TEXT FROM IMAGES

(71) Applicant: Palo Alto Research Center Incorporated, Palo Alto, CA (US)

(72) Inventors: Raja Bala, Pittsford, NY (US); Vijay K. Baikampady Gopalkrishna, Santa Clara, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 88 days.

(21) Appl. No.: 17/123,841

(22) Filed: Dec. 16, 2020

(65) Prior Publication Data

US 2022/0189088 A1 Jun. 16, 2022

(51) Int. Cl.
| | |
|---|---|
| *G06T 11/60* | (2006.01) |
| *G06T 7/11* | (2017.01) |
| *G06T 7/90* | (2017.01) |
| *G06T 11/00* | (2006.01) |
| *G06T 11/40* | (2006.01) |
| *G06V 10/22* | (2022.01) |
| *G06V 30/10* | (2022.01) |

(52) U.S. Cl.
CPC .......... *G06T 11/60* (2013.01); *G06T 7/11* (2017.01); *G06T 7/90* (2017.01); *G06T 11/001* (2013.01); *G06T 11/40* (2013.01); *G06V 10/22* (2022.01); *G06T 2207/20084* (2013.01); *G06V 30/10* (2022.01)

(58) Field of Classification Search
CPC ... G06T 11/60; G06T 7/11; G06T 7/90; G06T 11/001; G06T 11/40; G06T 2207/20084; G06V 10/22; G06V 30/10
See application file for complete search history.

(56) References Cited

U.S. PATENT DOCUMENTS

| | | | |
|---|---|---|---|
| 9,014,255 B2 | 4/2015 | Schweid et al. | |
| 2014/0185104 A1* | 7/2014 | Hasegawa | H04N 1/407 358/452 |
| 2021/0357512 A1* | 11/2021 | Busila | G06F 21/60 |

OTHER PUBLICATIONS

Hu, J. et al., "Image-to-Image Translation with Conditional-GAN," CS230: Deep Learning, Spring 2018, Stanford University, CA.
(Continued)

*Primary Examiner* — Jennifer Mehmood
*Assistant Examiner* — Andrew Shin
(74) *Attorney, Agent, or Firm* — Fox Rothschild LLP

(57) ABSTRACT

Methods of removing text from digital video or still images are disclosed. An image processing system receives an input image set defining a region of interest (ROI) that contains text. The system determines an input background color for the ROI. The system applies a text infilling function to remove text from the ROI to yield a preliminary output image set. The system may determine a residual corrective signal that corresponds to a measurement of background color error between the input set and the preliminary output set. The system may apply the residual corrective signal to the ROI in the preliminary output set to yield a final output set that does not contain the text. Alternatively, the system may remove background from the ROI of the input set before text infilling, then return background to the ROI after the text infilling.

20 Claims, 6 Drawing Sheets

(56) References Cited

OTHER PUBLICATIONS

Wexler, Y. et al., "Space-Time Video Completion," Dept. of Computer Science and Applied Math, The Weizmann Institute of Science, Rehovot, 76100 Israel.
He, K. et al., "Mask R-CNN," Computer Vision Foundation, pp. 2961-2969.
Nakamura, T., et al., "Scene Text Eraser," arXiv:1705.02772v1 [cs:CV] May 8, 2017.
Zhang, S. et al., "EnsNet: Ensconce Text in the Wild," arXiv:1812.00723v1 [cs.CV] Dec. 3, 2018.
Tursun, O. et al., "MTRNet: A Generic Scene Text Eraser," arXiv:1903.04092v3 [cs.CV] Oct. 22, 2019.
Xu, R. et al., "Deep Flow-Guided Video Inpainting," Computer Vision Foundation, pp. 3723-3732.
Kim, D. et al., "Deep Blind Video Decaptioning by Temporal Aggregation and Recurrence," Computer Vision Foundation, pp. 4263-4272.
Ulyanov, D., et al., "Deep Image Prior," Computer Vision Foundation, pp. 9446-9454.
Yu, J. et al., "Generative Image Inpainting with Contextual Attention," Computer Vision Foundation, pp. 5505-5514.
Wang, T.C. et al., "High-Resolution Image Synthesis and Semantic Manipulation with Conditional GA Ns," arXiv:1711.11585v2 [cs.CV] Aug. 20, 2018.
Wang, T.C. et al., "Video-to-Video Synthesis," arXiv:1808.06601v2 [cs:CV] Dec. 3, 2018.

\* cited by examiner

METHOD AND SYSTEM FOR REMOVING SCENE TEXT FROM IMAGES

BACKGROUND

There are many situations in which the removal of scene text from an image or sequence of video image frames is desirable. For example, video sequences may contain images of storefronts with names, street signs, license plates, and other scenes that contain text. In some situations it is desirable to remove the scene text from the images in order to prevent disclosure of personally identifiable information, such as street names or vehicle plate numbers, to others who view the video. In other situations it is desirable to remove scene text in order to avoid creating images that contain a logo or product name that conflicts with obligations to advertisers or sponsors of the video. In other situations it may be desirable to remove scene text and replace it with personalized messages or messages that suit the particular storyline that the video sequence is presenting. Other applications, such as translation of scene text, can also benefit from text removal and replacement processes.

The removal of scene text from digital images is sometimes referred to as "text infilling" or "text inpainting." Manual text infilling is very time consuming, and can be imprecise. Therefore, several automated text infilling methods are known. However, the existing methods often yield results in which the tone or texture of the infilled text is still distinguishable from the original background, and/or results in which the background tone or texture has been altered to match the infilled area. In other situations, the background immediately adjacent to the text may be changed to white or some other color or texture that does is not consistent with that of the rest of the background.

This document describes methods and systems that are directed to addressing the issues listed above.

SUMMARY

In a first embodiment, a processor performs a method of digital image frame editing by; receiving an input set of one or more digital image frames and a defined a region of interest (ROI) that contains text; determining an input background color for the ROI in the digital image frames of the input set; and applying a text infilling function to the ROI in each of the digital image frames of the input set. The text infilling function removes the text from the ROI in each of the digital image frames of the input set to yield a preliminary output set of one or more digital image frames. The processor will determine a residual corrective signal that corresponds to a measurement of background color error between the input set and the preliminary output set. The processor will then apply the residual corrective signal to the ROI in each of the digital image frames of the preliminary output set to yield a final output set of ne or more digital image frames. The ROI in the final output set of one or more digital image frames will then not contain the text.

In a second embodiment, a processor implements a digital image frame editing method by: receiving an input set of one or more digital image frames and a defined a ROI that contains text; determining an input background color for the ROI in the digital image frames of the input set; subtracting the input background color from the ROI in the input sequence to yield a modified input set; and applying a text infilling function to the ROI in each of the digital image frames of the modified input set. The text infilling function removes the text from the ROI in each of the digital image frames of the input set to yield a preliminary output set of one or more digital image frames. The method then includes adding the input background color back into the ROI of preliminary output set to yield a modified ROI, and applying the modified ROI to the input set to yield a final output set of one or more digital image frames, wherein the ROI in the final output set of one or more digital image frames does not contain the text.

In either embodiment, receiving the input set of digital image frames and the defined ROI may include: receiving the input set of digital image frames; applying a text detector to the digital image frames of the input set to return bounding box coordinates; and defining the ROI according to the bounding box coordinates in each of the digital image frames of the input set.

Optionally, determining the input background color for the ROI may include generating a binary mask for the ROI. Then for each pixel in the ROI, the processor may multiply a color value of the pixel by a value of the binary mask. The processor may then determine a mean of the values returned in the multiplying step, a weighted average of the values returned in the multiplying step, or some other function of the returned values to yield the input background color.

Optionally, applying the text infilling function to the ROI in each of the digital image frames of the input set may include using a generative adversarial network (GAN) to process the image(s) and modify text-containing pixels within the ROI of each digital image frames in the input set so that the text-containing pixels no longer have text but instead have a color that corresponds to a background color. The GAN may be, for example, a video-to-video (vid2vid) synthesis model, or a picture-to-picture (pix2pix) model.

Optionally, each of the digital image frames in each of the sets may have multiple color channels. If so, the residual corrective signal may include multiple correction values, each of which applies to one of the color channels.

Optionally, applying the residual corrective signal to the ROI in each of the digital image frames of the preliminary output set includes, for each color channel of each pixel of each digital image frame of the output set, adjusting a color value of that color channel by the correction value for that color channel.

Optionally, the method also may include modifying the ROI in each of the digital image frames in the final output set by adding new text to the ROI in each of the digital image frames in the final output set.

DETAILED DESCRIPTION

Figure 1:
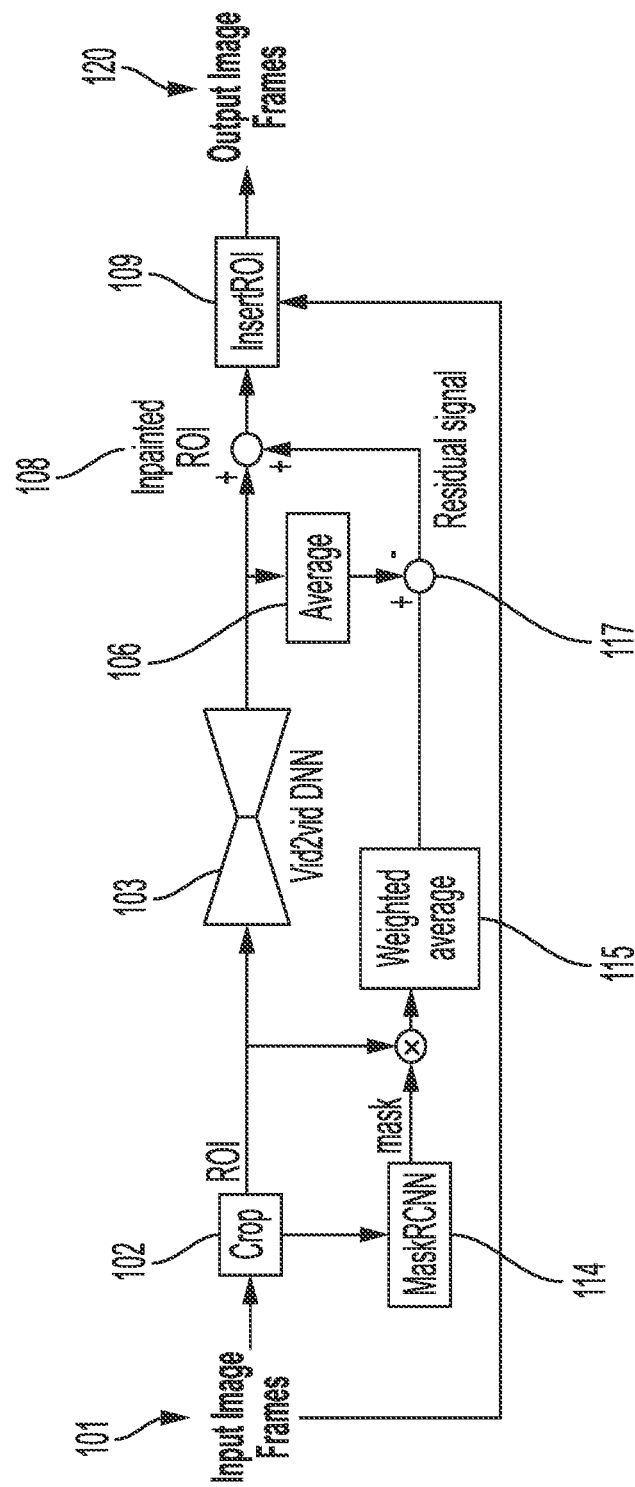
FIG. 1 illustrates an example text infilling process for an image or video sequence.

As used in this document, the singular forms "a," "an," and "the" include plural references unless the context clearly dictates otherwise. Unless defined otherwise, all technical and scientific terms used in this document have the same meanings as commonly understood by one of ordinary skill in the art. As used in this document, the term "comprising"

(or "comprises") means "including (or includes), but not limited to." When used in this document, the term "exemplary" is intended to mean "by way of example" and is not intended to indicate that a particular exemplary item is preferred or required.

In this document, when terms such "first" and "second" are used to modify a noun, such use is simply intended to distinguish one item from another, and is not intended to require a sequential order unless specifically stated. The term "approximately," when used in connection with a numeric value, is intended to include values that are close to, but not exactly, the number. For example, in some embodiments, the term "approximately" may include values that are within +/−10 percent of the value.

In this document, the term "text" will be used to refer to a sequence of one or more alphanumeric characters, and may include letters, numbers, punctuation marks, mathematical symbols and/or other conventional symbols.

Additional terms that are relevant to this disclosure will be defined at the end of this Detailed Description section.

As noted in the Background section above, the removal of scene text from digital images is sometimes referred to as "text infilling" or "text inpainting". There are several known methods of text infilling, including methods that use deep neural networks. One known method uses the "pix2pix" methods, which uses a conditional generative adversarial network (GAN) to translate a first image to a second image. The pix2pix method is described in numerous publications, including Wang et al., "High Resolution Image Synthesis and Semantic Manipulation with Conditional GANs" (arxiv 2018). The conditional GAN of pix2pix is trained on a dataset of image pairs [s, x] in which each s is a semantic label map (i.e., images in which labels have been assigned to text) and each x is a corresponding natural photo. The pix2pix method uses a generator G and a discriminator D. The role of the generator is to translate semantic label maps into realistic-looking images. The role of the discriminator is to take the output of the generator and try to distinguish real images from translated ones. Training enables the conditional GAN to map images that contain text to inpainted versions of those images, from which the text has been removed. In the pix2pix method, a generator such as the U-Net encoder-decoder network may be used, and a discriminator such as a patch-based fully convolutional network may be used. This is known and has been described in more detail in, for example, Hu et al., "Image-to-Image Translation with Conditional-GAN" (Stanford University 2018).

The pix2pix method can be used for text infilling of individual images, but it may be time-consuming and inefficient to apply to a sequence of video images. In addition, even if used, in current applications it can result in image frames that have the issues described in the Background section above.

To address this, this document describes a method of text infilling in a digital image or in a video sequence of digital image frames. The system uses a video-to-video synthesis method to perform an initial text inpainting operation on the image frames. It then determines a residual corrective signal and applies that signal to the inpainted frames to yield a final output.

Figure 2:
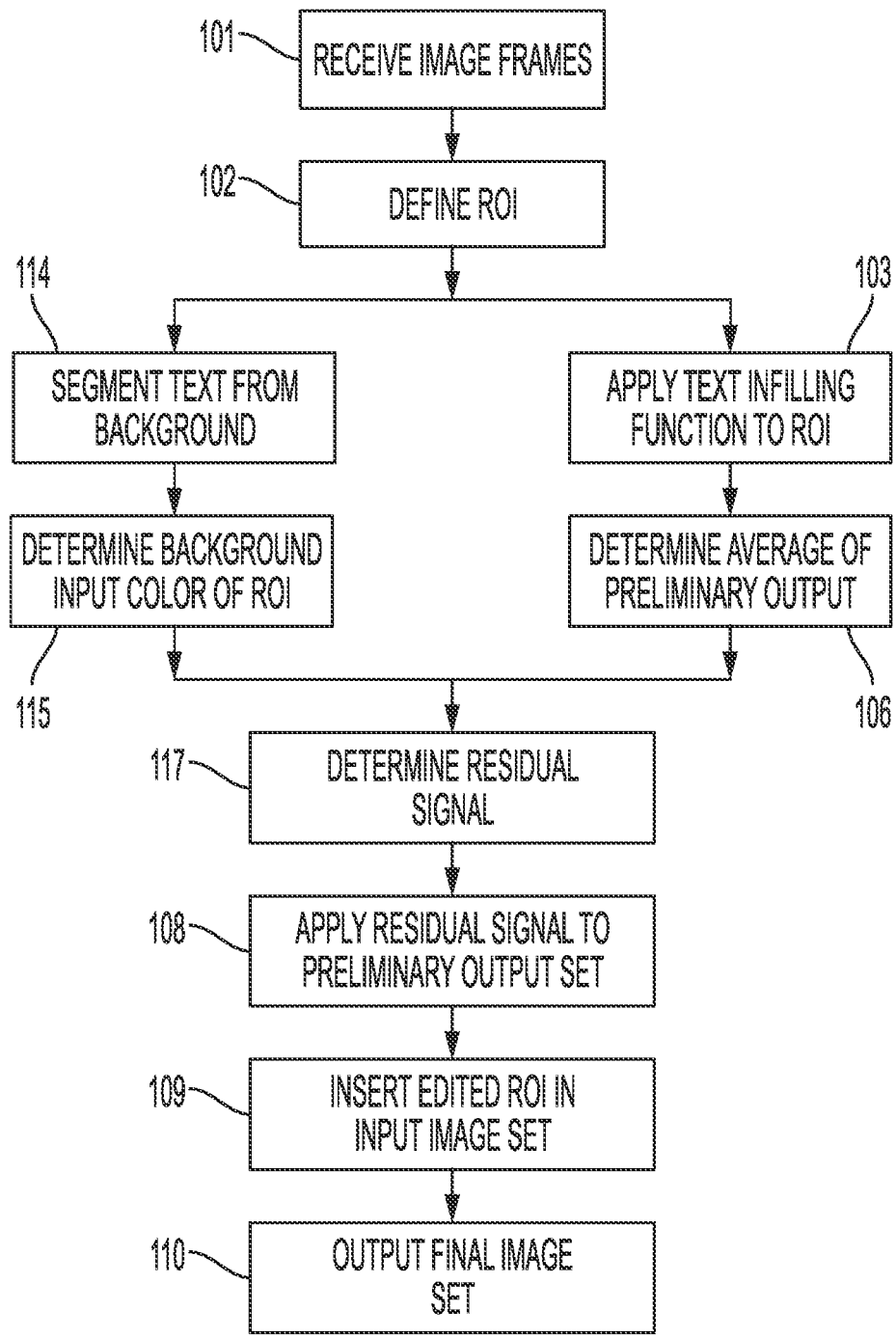
FIG. 2 illustrates the steps of FIG. 1 in flowchart format.

An example workflow is shown in FIG. 1. FIG. 2 illustrates the steps of FIG. 1 in flowchart format. At 101 an image processing system will receive an input set of one or more digital image frames. (In this document, the set may include a single digital image or a sequence of digital images, as in a video.) The system may do this by receiving them from a remote computing device via a communication link, by retrieving them from a local or cloud-based memory device, or in real-time as a camera of the system captures the digital image frames as a video.

The image frames received at step 101 may be pre-processed, in that they have been cropped to identify a defined region of interest (ROI) that contains text. If not, then at 102 the system may process the image frames with a text detector that returns bounding box coordinates for cropping the text ROI in each frame. A text detector is a set of programming instructions that a computing device uses to process an image with a feature detector such as the tesseract algorithm, MSER algorithm detector, a convolutional neural network (CNN) or any now or hereafter known optical character recognition (OCR) process.

The system then processes the images in two parallel paths. In a first path, at 103 the system will apply a text infilling function to the ROI by processing the images and modify text-containing pixels in the ROI of each digital image with pixels so that those pixels exhibit a background color of the ROI instead of the text color. In some embodiments, the text infilling function may be the pix2pix model, as described above, with the function applied to each image of the sequence, or to a subset of the images in the sequence (such as a group of images over a specified time period, or every other image). Alternatively, another GAN may be used to process the image and replace text with background color.

For example, at 103 the vid2vid method of video image synthesis may be used as shown in FIG. 1. After step 103 pixels that were within the ROI will no longer exhibit a color that corresponds to text but instead will exhibit a color that appeared in the background of the ROI. The output of the GAN at step 103 will be a preliminary output set of one or more image frames (i.e., an image or a sequence of frames in a video) in which the text pixels have been infilled with the background color.

In a parallel path, at 114 the system will separate foreground (text) from background (non-text) in the ROI. For example, the system may pass the ROI through a foreground-background segmentation module such as Mask-RCNN. The foreground-background segmentation module will generate a binary mask in which each pixel in the ROI is assigned a value of either zero (0) or one (1), wherein one of the values corresponds to foreground (text) and the other value corresponds to background (non-text). Each pixel of the ROI in the original image will have a color value, which in an RGB color model will include three channels (i.e., three channels, one for a red component R, one for a blue component G, and one for a blue component B). At 115 the system will then determine an input background color value for each channel in the ROI. For example, if the mask assigns background pixels a mask value of 1, the system may multiply each ROI pixel's color value by its binary mask value, and then determine a mean value of all pixels in each channel for the background of the ROI after the multiplication. Optionally, the input background color may be a weighted average of the pixel values in the ROI. For example, RGB channels may be given equal weights, but for other channels that use characteristics such as luminance and chrominance, the luminance channel may be given more weight than that of the chrominance channel.

At 106 the system will also determine, for each color channel, an average of the color values of all pixels in the preliminary output set. As with step 115, the average of step 106 may actually be a mean, or a weighted average. At 117 the system will then compare the color value of each channel returned at step 106 to the color value of each corresponding channel returned at step 115 to generate a residual signal. The residual signal will be a C-dimensional vector, in which C represents the number of output channels of the network. The value of each channel in the residual signal may be a positive number or a negative number, depending on the results of the comparing step 117.

At 108 the residual signal is applied to the preliminary output set so that, for each pixel in the ROI of the preliminary output signal, the color value for each channel of the pixel is summed with the corresponding value of the residual signal for that channel. This yields a final edited ROI, which may be applied to the input video frames at 109 as a replacement ROI, thus yielding the final output video frame sequence at 110.

In various embodiments, the GAN used at step 103 may be the vid2vid network (if video is the input), pix2pix (if video or a single image is the input), or another network that, prior to the processing, has been trained to minimize one or more of the following loss terms:

Reconstruction loss: This is the error between a predicted inpainted ROI and ground truth. This prediction includes the residual correction that would be performed at step 108. This loss may be defined in a pixel space (i.e., L1 norm, which is the sum of absolute pixel values, or L2 norm, which is the square root of the sum of squared pixel values), spatially filtered pixel values, or feature space (such as perceptual loss in a VGG convolutional neural network architecture).

Spatial adversarial loss: The generator in a GAN such as vid2vid must be trained to produce realistic inpainted images that fool a discriminator trained to distinguish real from fake inpainted images.

Temporal adversarial loss: The generator in a GAN such as vid2vid also must produce temporally consistent inpainted videos that fool a discriminator trained to distinguish real from fake inpainted video clips.

Other losses, such as the difference between foreground and background pixel statistics (such as mean or variance), or the difference in background regions between predicted output and input.

Ground truth for inpainted regions may be determined in any number of ways, such as using a graphics rendering program to create a dataset of image pairs, in which each pair has the same scene but only one pair has text.

Figure 3:
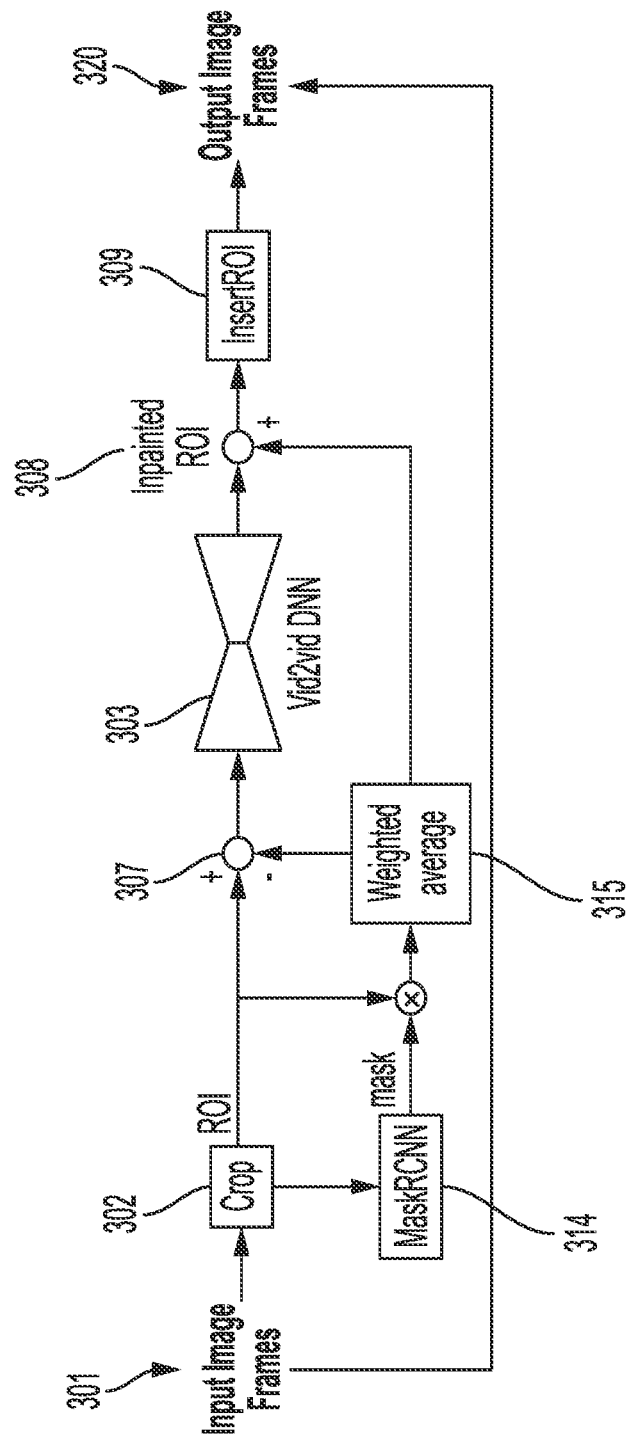
FIG. 3 illustrates a variation of the text infilling process.
Figure 4:
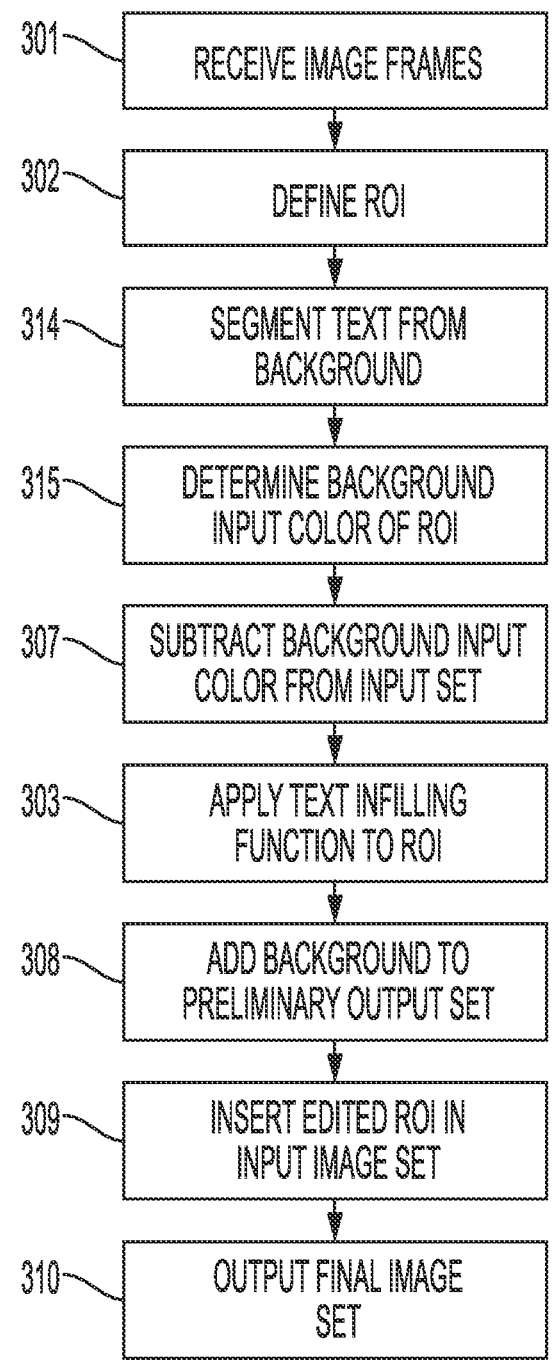
FIG. 4 illustrates the steps of FIG. 3 in flowchart format.

A variation of the workflow is shown in FIG. 3. FIG. 4 illustrates the steps of this variation in flowchart format. At 301 a video image processing system will receive an input set of one or more digital image frames as described above. The image frames received at step 301 may be pre-processed, in that they have been cropped to identify a defined ROI that contains text. If not, then at 302 the system may process the image frames with a text detector that returns bounding box coordinates for cropping the text ROI in each frame.

As with the first embodiment, the system processes the images in two parallel paths. However, before applying the text infilling function, the system will consider the binary mask. First, at 314 the system will separate foreground (text) from background (non-text) in the ROI, using methods such as those described above for the first embodiment. At 315 the system will then determine an input background color value for each channel in the ROI. For example, if the mask assigns background pixels a mask value of 1, the system may multiply each ROI pixel's color value by its binary mask value and then determine a mean value of all background pixels in each channel of the ROI after the multiplication. Optionally, the input background color may be a weighted average of the pixel values in the ROI, as previously described.

At 307 the system will subtract the weighted average background color returned at step 315 from each of the input video frames. This will yield a modified input set that may be processed by the text infilling function at 303 to yield a preliminary output sequence of image frames in which the text pixels have been infilled with the background color. At 308 the system will then add back the background weighted average background color returned at step 315 to yield a final edited ROI, which may be applied as to the set of input video frames at 309 as a replacement ROI, yielding the final output video frame set at 310. The system may then save the output video frame set to a memory as one or more digital files, and/or the system may present the output video frame set on a display of a computing device.

Figure 5:
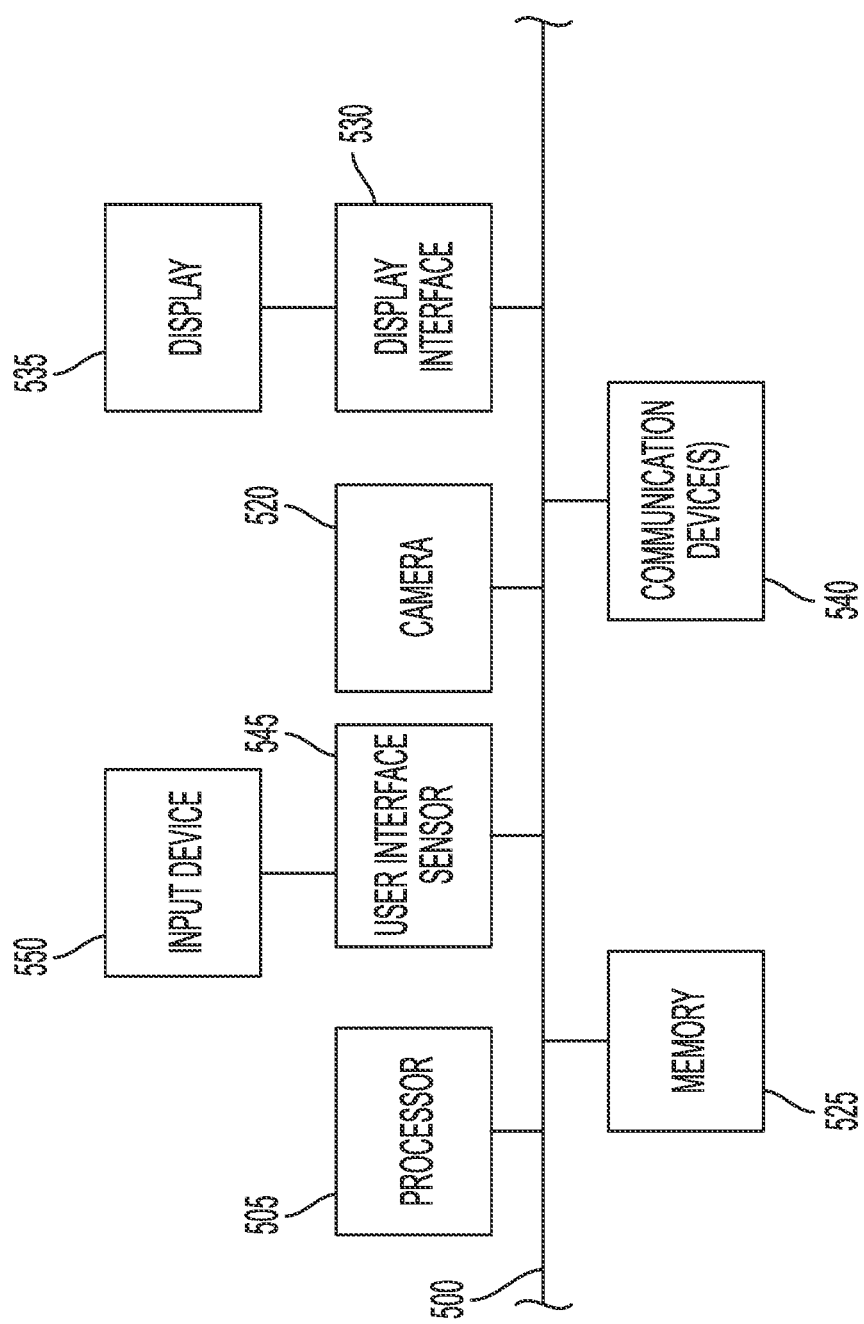
FIG. 5 illustrates example hardware elements of a video processing system.

FIG. 5 depicts an example of internal hardware that may be included in an image processing system, such as a local or remote computing device that processes image frames as described above. An electrical bus 500 serves as an information highway interconnecting the other illustrated components of the hardware. Processor 505 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. The programming instructions may be configured to cause the processor to perform any or all of the methods described above. Read only memory (ROM), random access memory (RAM), flash memory, hard drives and other devices capable of storing electronic data constitute examples of memory devices 525. A memory device may include a single device or a collection of devices across which data and/or instructions are stored.

An optional display interface 530 may permit information from the bus 500 to be displayed on a display device 535 in visual, graphic or alphanumeric format. An audio interface and audio output (such as a speaker) also may be provided. Communication with external devices may occur using various communication devices 540 such as a wireless antenna, an RFID tag and/or short-range or near-field communication transceiver, each of which may optionally communicatively connect with other components of the device via one or more communication system. The communication device 540 may be configured to be communicatively connected to a communications network, such as the Internet, a local area network or a cellular telephone data network.

The hardware may also include a user interface sensor 545 that allows for receipt of data from input devices 550 such as a keyboard, a mouse, a joystick, a touchscreen, a touch pad, a remote control, a pointing device and/or microphone. Such devices may be used to help label images in training the model. Digital image frames also may be received from a camera 520 that can capture video and/or still images.

Figure 6:
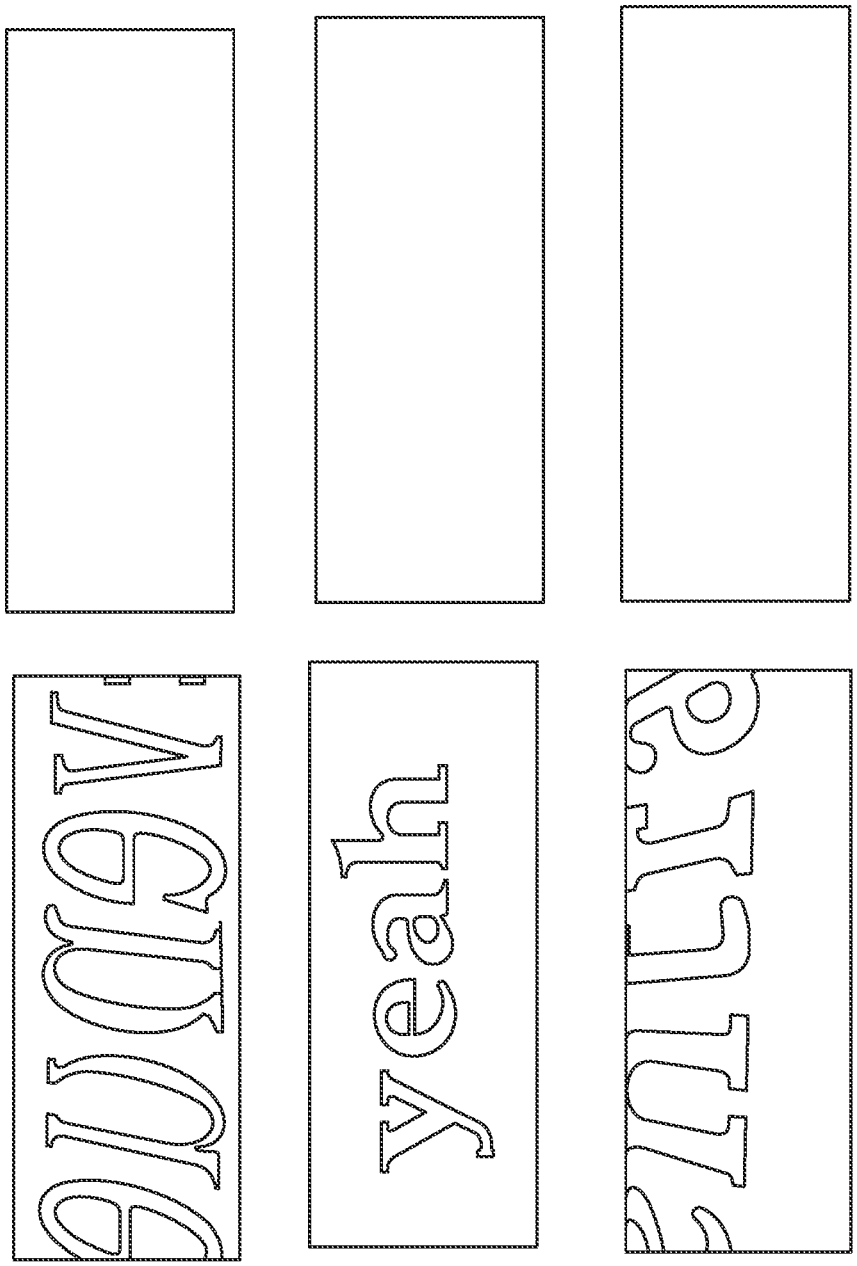
FIG. 6 illustrates example images, before and after processing using methods described in this document.

FIG. 6 illustrates example applications of the methods described in this document to actual images. On the left side of FIG. 6 is a column with several images that contain text, prior to processing. The right column shows, for each image on the left, images that were output after text was infilled according to methods described above.

Terminology that is relevant to this disclosure includes:

An "electronic device" or a "computing device" refers to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, digital home assistants and mobile electronic devices such as smartphones, personal digital assistants, cameras, tablet computers, laptop computers, media players and the like. Electronic devices also may include components of vehicles such as dashboard entertainment and navigation systems, as well as on-board vehicle diagnostic and operation systems. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container also may be considered an electronic device. In the discussion above, a client device, server device, virtual machine or container may be referred to simply as a "device" for brevity. Additional elements that may be included in electronic devices are discussed above in the context of FIG. 5.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

In this document, the term "camera" refers generally to a hardware sensor that is configured to acquire digital images. An imaging device may capture still and/or video images, and optionally may be used for other imagery-related applications.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A digital image frame editing method comprising, by a processor:
   receiving an input set of one or more digital image frames and a defined region of interest (ROI) that contains text;
   determining an input background color for the ROI in the one or more digital image frames of the input set;
   applying a text infilling function to the ROI in each of the digital image frames of the input set, wherein the text infilling function removes the text from the ROI in each of the digital image frames of the input set to yield a preliminary output set of one or more digital image frames;
   determining a residual corrective signal that corresponds to a measurement of background color error between the input set and the preliminary output set; and
   applying the residual corrective signal to the ROI in each of the digital image frames of the preliminary output set to yield a final output set of one or more digital image frames, wherein the ROI in the final output set does not contain the text.

2. The method of claim 1, wherein receiving the input set of one or more digital image frames and the defined ROI comprises:
   receiving the input set of one or more digital image frames;
   applying a text detector to each the digital image frames of the input set to return bounding box coordinates; and
   defining the ROI according to the bounding box coordinates in each of the digital image frames of the input set.

3. The method of claim 1, wherein determining the input background color for the ROI comprises:
   generating a binary mask for the ROI;
   for each pixel in the ROI, multiplying a color value of the pixel by a value of the binary mask; and
   determining a mean of the values returned in the multiplying step.

4. The method of claim 1, wherein determining the input background color for the ROI comprises:
   generating a binary mask for the ROI;
   for each pixel in the ROI, multiplying a color value of the pixel by a value of the binary mask; and
   determining a weighted average of the values returned in the multiplying step.

5. The method of claim 1, wherein applying the text infilling function to the ROI in each of the digital image frames of the input set comprises using a generative adversarial network to process the one or more digital image frames of the input set and modify text-containing pixels within the ROI of each digital image frame in the input set so that the text-containing pixels no longer have text but instead have a color that corresponds to a background color.

6. The method of claim 5, wherein the generative adversarial network comprises:
   a video-to-video (vid2vid) synthesis model; or
   a picture-to-picture (pix2pix) model.

7. The method of claim 1, wherein:
   each of the digital image frames in each of the sets comprises a plurality of color channels; and
   the residual corrective signal comprises a plurality of correction values, each of which applies to one of the color channels.

8. The method of claim 1, wherein applying the residual corrective signal to the ROI in each of the digital image frames of the preliminary output set comprises, for each color channel of each pixel of each digital image frame of the preliminary output set, adjusting a color value of that color channel by the correction value for that color channel.

9. The method of claim 1, further comprising modifying the ROI in each of the digital image frames in the final output set by adding new text to the ROI in each of the digital image frames in the final output set.

10. A digital image frame editing method comprising, by a processor:
   receiving an input set of one or more digital image frames and a defined a region of interest (ROI) that contains text;
   determining an input background color for the ROI in the one or more digital image frames of the input set;
   subtracting the input background color from the ROI in the input set to yield a modified input set of one or more digital image frames;
   applying a text infilling function to the ROI in each of the digital image frames of the modified input set, wherein the text infilling function removes the text from the ROI in each of the digital image frames of the modified input set to yield a preliminary output set of one or more digital image frames;
   adding the input background color back into the ROI of preliminary output set to yield a modified ROI; and
   applying the modified ROI to the input set to yield a final output set of one or more digital image frames, wherein the ROI in the final output set of one or more digital image frames does not contain the text.

11. The method of claim 10, wherein receiving the input set of one or more digital image frames and the defined ROI comprises:
   receiving the input set of one or more digital image frames;
   applying a text detector to the one or more digital image frames of the input set to return bounding box coordinates; and
   defining the ROI according to the bounding box coordinates in each of the digital image frames of the input set.

12. The method of claim 10, wherein determining the input background color for the ROI comprises:
   generating a binary mask for the ROI;
   for each pixel in the ROI, multiplying a color value of the pixel by a value of the binary mask; and
   determining a mean of the values returned in the multiplying step.

13. The method of claim 10, wherein determining the input background color for the ROI comprises:
   generating a binary mask for the ROI;
   for each pixel in the ROI, multiplying a color value of the pixel by a value of the binary mask; and
   determining a weighted average of the values returned in the multiplying step.

14. The method of claim 10, wherein applying the text infilling function to the ROI in the modified input set comprises using a generative adversarial network to process the one or more digital image frames in the modified input set and modify text-containing pixels within the ROI of each digital image in the modified input set so that the text-containing pixels no longer have text but instead have a color that corresponds to a background color.

15. The method of claim 14, wherein the generative adversarial network comprises:
   a video-to-video (vid2vid) synthesis model; or
   a picture-to-picture (pix2pix) model.

16. The method of claim 10, wherein:
   each of the digital image frames in each of the sequences comprises a plurality of color channels; and
   the input background color a plurality of color values, each of which applies to one of the color channels.

17. The method of claim 10, further comprising modifying the ROI in each of the digital image frames in the final output set by adding new text to the ROI in each of the digital image frames in the final output set.

18. A digital image frame editing system comprising:
   a processor; and
   a memory containing programming instructions that are configured to cause the processor to:
      receive an input set of one or more digital image frames and a defined a region of interest (ROI) that contains text,
      determine an input background color for the ROI in the one or more digital image frames of the input set,
      apply a text infilling function to the ROI in each of the digital image frames of the input set, wherein the text infilling function removes the text from the ROI in each of the digital image frames of the input set to yield a preliminary output set of one or more digital image frames,
      determine a residual corrective signal that corresponds to a measurement of background color error between the input sequence and the preliminary output sequence,
      apply the residual corrective signal to the ROI in each of the digital image frames of the preliminary output set to yield a final output set of one or more digital image frames, wherein the ROI in the final output set of one or more digital image frames does not contain the text, and
      save the final output set of one or more digital image frames to a memory device.

19. The system of claim 18 further comprising:
   a display; and
   additional instructions configured to output the final output set of one or more digital image frames on the display.

20. The system of claim 19, wherein the instructions to receive the input set of one or more digital image frames and the defined ROI comprise instructions to:
   receive the input set of one or more digital image frames;
   apply a text detector to the one or more digital image frames of the input set to return bounding box coordinates; and
   define the ROI according to the bounding box coordinates in each of the digital image frames of the input set.

* * * * *